United States Patent [19]

Garman et al.

[11] Patent Number: 4,618,190

[45] Date of Patent: Oct. 21, 1986

[54] TRACK JOINT RETAINING APPARATUS

[75] Inventors: James A. Garman, Eureka, Ill.;
Stephen D. Swift, Yacolt, Wash.;
Richard E. Livesay, Peoria; Arlyn J. Arians, Washburn, both of Ill.

[73] Assignee: Caterpillar Inc., Peoria, Ill.

[21] Appl. No.: 734,526

[22] Filed: May 16, 1985

Related U.S. Application Data

[63] Continuation-in-part of Ser. No. 476,909, Mar. 18, 1983, abandoned.

[51] Int. Cl.[4] .......................................... B62D 55/20
[52] U.S. Cl. .................................. 305/39; 305/58 R; 474/223
[58] Field of Search ............... 474/223; 411/360, 361; 305/39, 53, 54, 58 R, 60

[56] References Cited

U.S. PATENT DOCUMENTS

| 1,418,316 | 6/1922 | McKee | |
| 1,507,757 | 9/1924 | Savage | |
| 2,141,771 | 12/1938 | Sparling | 74/254 |
| 2,823,081 | 2/1958 | Mayo | 305/10 |
| 3,027,201 | 3/1962 | Blazek et al. | 305/58 |
| 3,086,404 | 4/1963 | Krekeler | 74/254 |
| 3,101,221 | 8/1963 | Waddell | 305/54 |
| 3,529,856 | 9/1970 | Smith et al. | 285/343 |
| 3,554,588 | 1/1971 | Reinsma et al. | 287/100 |
| 3,831,257 | 8/1974 | Boggs et al. | 29/401 |
| 3,888,133 | 6/1975 | Krekeler | 74/254 |
| 3,924,882 | 12/1975 | Ellis | 285/175 |
| 3,937,123 | 2/1976 | Matuschek et al. | 85/72 |
| 4,084,423 | 4/1978 | Schlecht | 72/256 |
| 4,141,125 | 2/1979 | Blunier | 29/148.3 |
| 4,149,758 | 4/1979 | Livesay | 305/11 |
| 4,163,589 | 8/1979 | Fox et al. | 305/14 |
| 4,182,578 | 1/1980 | Livesay et al. | 403/317 |
| 4,222,616 | 9/1980 | Brewer | 305/54 |
| 4,262,971 | 4/1981 | Shuler | 305/14 |
| 4,265,084 | 5/1981 | Livesay | 59/7 |
| 4,288,172 | 9/1981 | Livesay et al. | 403/317 |

FOREIGN PATENT DOCUMENTS

| 0008959 | 9/1979 | European Pat. Off. |
| 881584 | 4/1943 | France |
| 939681 | 11/1948 | France |
| 1063621 | 5/1954 | France |
| 1167081 | 6/1956 | France |
| WO81/00545 | 3/1981 | PCT Int'l Appl. |
| 1079769 | 8/1967 | United Kingdom |

Primary Examiner—David A. Scherbel
Attorney, Agent, or Firm—O. Gordon Pence

[57] ABSTRACT

Apparatus for retaining a joint of an endless track for a crawler-type vehicle is provided which includes a metal preform which is pressed into a retainer cavity surrounding and located at each of the ends of the joint of the track. The cavities are cooperatively formed by a pin groove in the opposite end portions of the pin and a link socket in the respective link outboard end portions and which are disposed in registry with the pin grooves. Once intruded into the cavities, the formed-in-place retainers thereby provided virtually eliminate any end play in the joint during operation of the crawler vehicle.

40 Claims, 12 Drawing Figures

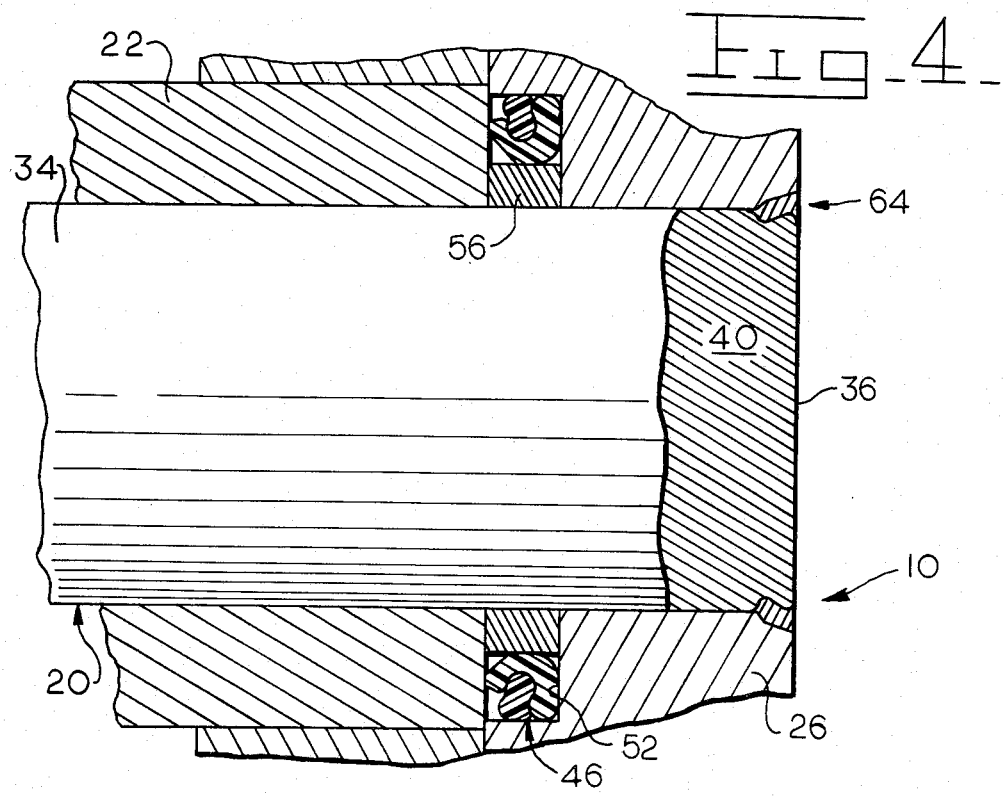

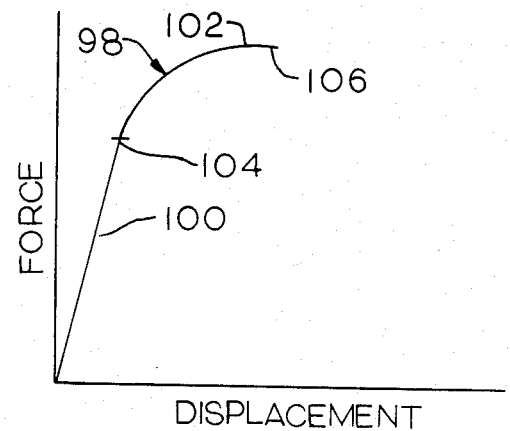
Fig_7_
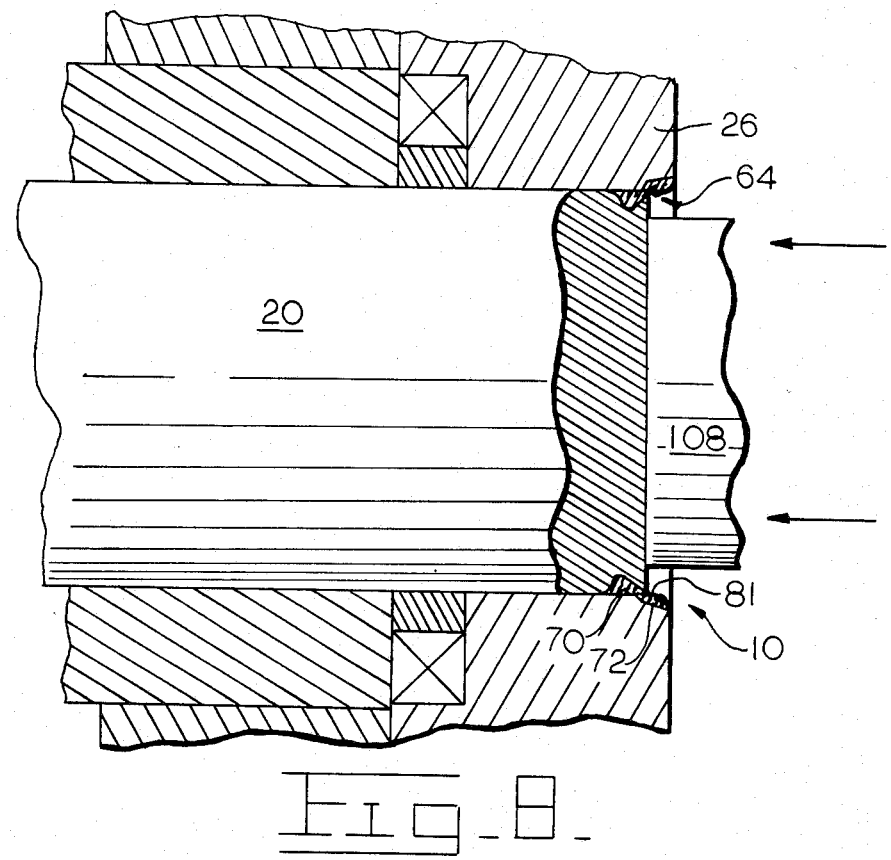
Fig_8_

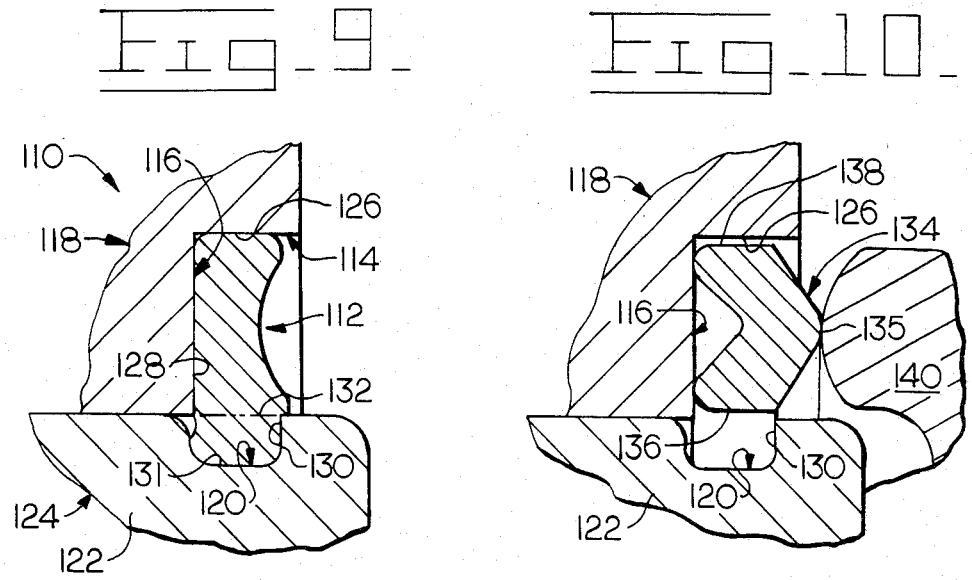
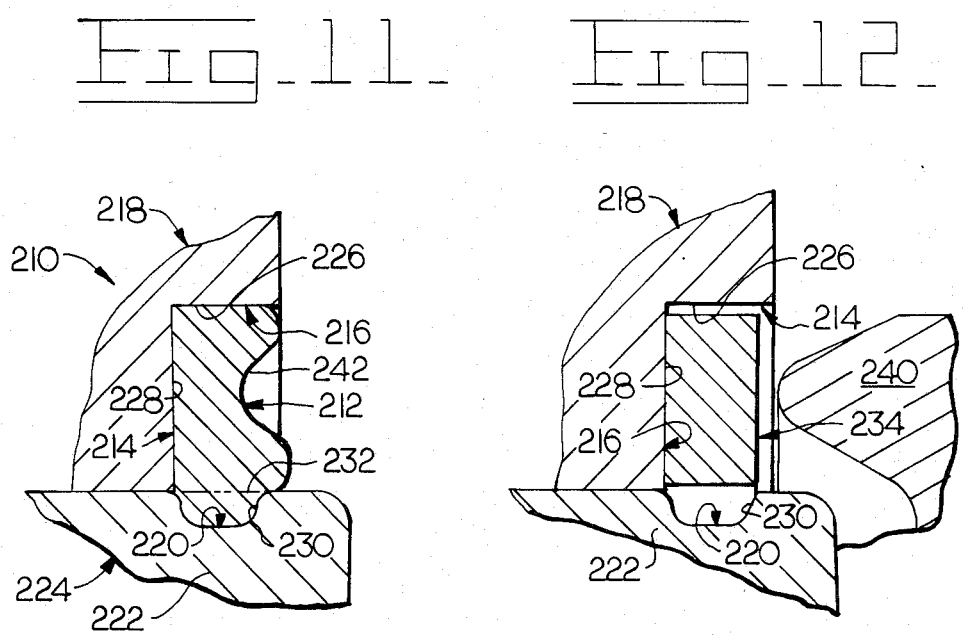

TRACK JOINT RETAINING APPARATUS

CROSS REFERENCE TO RELATED APPLICATIONS

This application is a continuation-in-part of application Ser. No. 476,909 filed Mar. 18, 1983, now abandoned by James A. Garman and Stephen D. Swift.

TECHNICAL FIELD

This invention relates generally to an endless track for crawler-type vehicles and more particularly to apparatus for retaining a joint of such track.

BACKGROUND ART

A track joint is customarily held together by an interference fit between the ends of the track pins and their respective link bores into which the pin ends are tightly received. Even though a very high press force, varying from 60 to 150 tons depending on track size, is typically used to press the links onto their respective pin ends, the links still have a tendency to move outwardly on the pin as a result of working forces exerted on the track during operation of the vehicle. This outward movement causes the joints to become loose or develop what is frequently referred to as end play.

Until recently, the amount of end play which developed in operation was normally within acceptable limits and was not critical to the operation of the track. However, with the introduction of larger crawler vehicles and engines with greater horsepower, even for smaller vehicles, the amount of end play has increased so as to become a concern, especially for sealed and lubricated track. In sealed and lubricated track, excessive end play can lead to a loss of the lubricant and the ingress of abrasive materials which can lead to excessive wear and premature failure of the track.

Various methods have been employed to limit the amount of end play in track joints. Keeper assemblies, such as those disclosed in U.S. Pat. No. 4,182,578 issued on Jan. 8, 1980 and U.S. Pat. No. 4,288,172 issued on Sept. 8, 1981, both to Richard E. Livesay et al. and both assigned to the assignee hereof, have been successfully employed to reduce such end play movement. In order to accommodate manufacturing tolerances, joints utilizing such keepers must have a certain amount of clearance which produces a limited amount of built-in end play. As a result, these keepers reduce, but do not completely eliminate, end play.

Another method of limiting end play is disclosed in U.S. Pat. No. 3,831,257 issued to Roger L. Boggs et al. on Aug. 27, 1974, which patent is also assigned to the assignee hereof, wherein welding about the ends of the track pins is employed. In this method, retention is quite dependent on the strength of the weld. In practice, weld strength is difficult to control with any degree of consistency. If a weld is so weak that it breaks, all of its retention ability is lost.

In U.S. Pat. No. 1,507,757 issued to Edwin H. Savage on Sept. 9, 1924, a soft metal key is driven through an opening in a rail and shoe of a track unit and into an angled pin groove to provide a locking device for securing the pin with the track unit.

DISCLOSURE OF THE INVENTION

In accordance with one aspect of the present invention, apparatus is provided for retaining a track joint having a pin and a pair of links. The pin has first and second end portions, each of which is mounted within a bore provided in each of the links. Each of the pin end portions has a groove extending around at least a portion of the circumference of such end portion. Each groove has a surface facing in a generally axially inward direction. Each bore of the links has an outwardly opening socket having a surface facing in a generally axially outward direction. The respective sockets and grooves are in registry with one another and cooperatively define a retainer cavity. A formed-in-place retainer is disposed and formed within and substantially conforms to the shape of each of the retainer cavities. Each retainer has a shear strength sufficient to maintain its respective link against outward axial movement upon the pin during operation of the track joint.

BRIEF DESCRIPTION OF THE DRAWINGS

FIG. 4 is an enlarged sectional view of one end of the joint illustrated in FIG. 1;

FIG. 5 is a greatly enlarged fragmentary sectional view of the apparatus shown in FIG. 1;

FIG. 6 is a view similar to FIG. 5, but illustrating a preform as it would appear entering the retainer cavity before deformation;

FIG. 7 is a force/displacement curve of a preferred embodiment of the formed-in-place retainer;

FIG. 8 is an enlarged sectional view similar to FIG. 4, but illustrating the formed-in-place retainer as it would appear when being sheared in response to removing the pin;

FIG. 9 is a fragmentary sectional view similar to FIG. 5, but showing another embodiment of the retaining apparatus of the present invention;

FIG. 10 is a view similar to FIG. 9, but illustrating a preform of the FIG. 9 embodiment as it would appear prior to forming into its formed-in-place retainer configuration;

FIG. 11 is a fragmentary sectional view similar to FIGS. 5 and 9, but showing still another embodiment of the retaining apparatus of the present invention; and FIG. 12 is a view similar to FIG. 11, but illustrating a preform of the FIG. 11 embodiment as it would appear prior to forming into its formed-in-place retainer configuration.

BEST MODE FOR CARRYING OUT THE INVENTION

Figure 1:
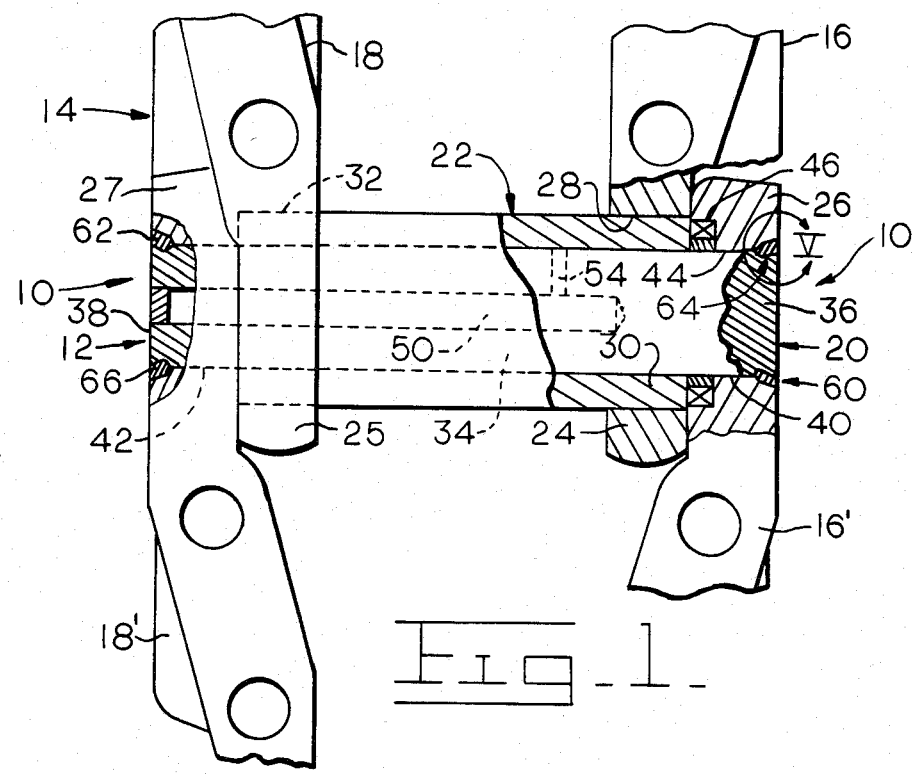
FIG. 1 is a fragmentary plan view of an endless track with a portion of a joint thereof in section illustrating an embodiment of the retaining apparatus.

Referring more particularly to FIG. 1 of the drawings, apparatus embodying the principals of the present invention is generally depicted at 10 for rigidly retaining a joint 12 of an endless track 14 of the type used on a crawler-type vehicle, not shown. The endless track 14 is generally of a conventional design, the major components of which include a plurality of right-hand links 16,16' and left-hand links 18,18', pins 20 and hollow bushings 22. Each right-hand link 16,16' and left-hand link 18,18' has an inboard end portion 24,25, and an opposite outboard end portion 26,27, respectively. The inboard end portions 24,25 each have a bore 28 of a size sufficient to enable the inboard end portions to be press fitted onto the ends 30,32 of the bushing 22. The pins 20 have a mid-portion 34, opposite ends 36 and 38 and opposite end portions 40 and 42. The pin mid-portion 34 is of a size to be received within the hollow bushing 22 and freely pivot relative to the bushing.

The outboard end portions 26,27 of the links 16',18' each have a bore 44. Each bore 44 is of a size sufficient to enable the outboard end links portions 26,27 to be press fitted onto the opposite end portions 40,42 of the pin 20.

The above assemblage is successively repeated with the next adjoining links, pins and bushings to complete the construction of the endless track.

While not intended to be so limited, the embodiment of the present invention to be hereinafter described is particularly well suited for use in an endless track which is sealed and lubricated. A track of this configuration normally has each joint provided with a pair of seals, one of which is shown at 46, and a lubricant reservoir, such as a sealed bore 50 in the pin 20. As best shown in FIG. 4, each seal 46 is disposed within a counterbore 52 in each link outboard end portion 26 and 27. Lubricant in the reservoir 50 is communicated to the pivoting interface between the bushing 22 and the mid-portion 34 of the pin 20 by a cross hole 54 in the pin 20, as best shown in FIG. 1. A thrust ring 56 is disposed in each of the counterbores 52 so that all of the joint components can be pushed together into abutment without crushing the seals 46. In other words, the outboard link end portions 26 and 27 are in close abutting contact with adjacent ends of the thrust rings 56. The other ends of the thrust rings abut the adjacent opposite end of the bushing 22. As a consequence, there is essentially no end play in the joint 12 after the assemblage is completed.

The apparatus 10 is principally directed toward maintaining the above-described abutting relationship during operation of the crawler-type vehicle. The apparatus 10 includes a pair of retainers 64,66, each of which is formed-in-place in a respective one of a pair of retainer cavities 60,62.

As both retainers 64,66 and their respective cavities 60,62 are mirror images of each other, only retainer 64 and cavity 60 will be hereinafter described in detail with particular reference to FIGS. 4 through 6, it being understood that such description applies to retainer 66 and cavity 62 as well.

Cavity 60 is defined by a pin groove 70 and a link socket 72. Groove 70 is formed in its respective pin end portion 40 and extends around at least a portion of the circumference of such end portion. While it should be understood that the groove 70 need be only partially or in segments about the circumference of the pin, it is preferable that it be continuous or annular to avoid the waste of time, labor and equipment in machining the part.

The groove 70 is disposed a preselected distance from the adjacent pin end 36. Such distance is related to the physical properties of the pin and is sufficient to provide the portion of the pin between its end 36 and the groove 70 with strength greater than that of the retainer 64. Maintaining this relative strength relationship functions to prevent damage or breakage of the pin during disassembly of the joint.

Referring to FIG. 5, the groove 70 preferably has a frustoconical surface 76, a bottom extremity 78 and a curvilinear side wall 80. The curvilinear side wall 80 extends from the cylindrical surface of the pin end portion 40 to the bottom extremity 78. The frustoconical surface 76 joins the curvilinear surface 80 adjacent the bottom extremity 78 and extends radially outwardly toward its peripheral edge adjacent the pin end 36. The frustoconical surface 76 is at an angle within a range of from between 20 to 30 degrees from its central axis, and preferably at an angle of approximately 25 degrees. The above configuration facilitates the substantially complete filling of the groove 70 by the retainer 64.

The socket 72 is formed in the link outboard end portion 26. The socket 72 is disposed in registry along an imaginary interface 81 with pin groove 70 when link outboard end portion 26 is in its installed position on the pin end portion 40. The socket 72 can be of other configurations depending on various criteria, such as material hardness and configuration of the retainer preform to be hereinafter described.

In the embodiment depicted in FIGS. 5 and 6, the socket 72 preferably has at least a first frustoconical surface 82. This first frustoconical surface 82 is disposed in a spaced concentric relationship to the groove frustoconical surface 76 and extends radially inwardly from an outer side 84 of the link outboard end portion 26 toward the link bore 44. The cavity 60 has an annular opening 85 on the outer side 84. The first frustoconical surface 82 is preferably disposed at a second angle which is less than the angle of the groove frustoconical surface 76. This second angle is preferably within a range of 15 to 25 degrees with an angle of about 20 degrees being preferable. Providing the first frustoconical surface 82 with an angle less than the angle of the groove frustoconical surface 76 advantageously produces a wedging action on the retainer 64 which facilities the loading of the retainer in shear on application of an axial force F, as shown in FIG. 5.

The socket 72 preferably includes a second frustoconical surface 86 extending from the first frustoconical surface 82 to an inner peripheral edge 88 adjacent the link bore 44. The second frustoconical surface 86 is preferably at an angle of approximately 45 degrees which facilitates the intrusion of the retainer 64 into the groove 70. The terms "intrusion" or "intruded" are used herein to describe a forming process in which metal is shaped by being rammed into a confined space by means of a high press force sufficient to cause the conformance of the metal to such space through metal flow, i.e., plastic deformation of the metal, during such process.

Figures 2, 3:
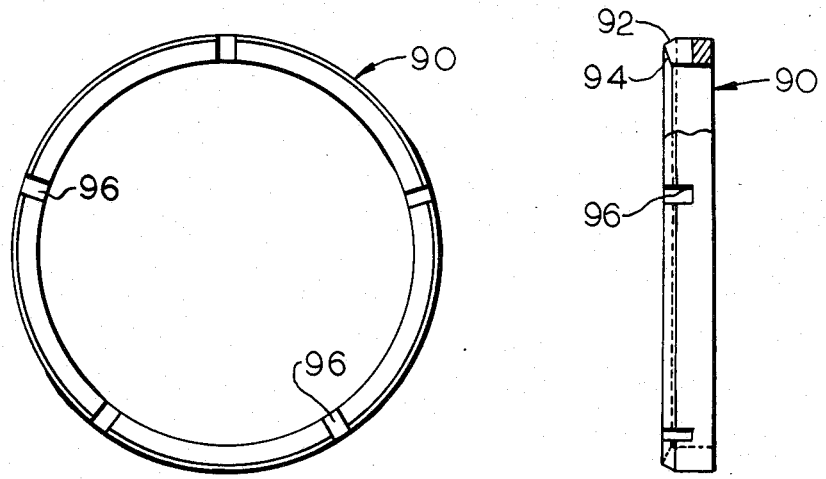
FIG. 2 a frontal view of a preferred embodiment of the preform.
FIG. 3 is a side view of the preform of FIG. 2.

Prior to being deformed, the formed-in-place retainers 64,66 are each identified as a preform 90, as shown in FIGS. 2, 3, and 6. While the preform 90 is herein disclosed as being a continuous ring, split or segmented rings are intended to be included within the scope of the present invention. It should also be understood that the preform 90 may take other configurations with the following description being exemplary of the preferred configuration.

As best shown in FIGS. 3 and 6, the preform 90 has a generally rectangular cross-sectional configuration provided with a lead-in chamfer 92 about the periphery of one end thereof and a beveled face 94 on such end. The lead-in chamfer is preferably at the same angle as the first frustoconical surface 82 of the socket 72. The beveled face 94 is preferably at an angle such that it is parallel to the side wall 80 of the groove upon intrusion of the preform into the cavity 60 to facilitate filling of the groove 70.

As best shown in FIGS. 2 and 3, the preform 90 is preferably provided with a plurality of radially oriented slots 96. The slots 96 extend a preselected axial distance into the preform 90 from the beveled end face 94. This arrangement is advantageous during any required disassembly of the joint 12, as hereinafter described, and facilitates the intrusion of the preform 90 into the groove 70.

In order to provide sufficient strength and rigidity for use in the track joint 12, the preform 90 is a ferrous material having a modulus of elasticity in the range of 19 to 30 million psi (131,000 to 207,000 MPa). A preform 90 constructed from a wrought steel with a hardness in a range of from Rockwell B60 to C35 has been found to be preferred. It should be understood, however, that the hardness of the preform 90 must be less than the corresponding hardness of the materials of the link and pin forming the cavity 60.

A ferrous powdered metal material can be satisfactorily used for the preform 90. Such powdered metal preform 90 preferably has a minimum initial density of 6.8 grams per cubic centimeter. After installation, the powdered metal material preferably has a minimum density of 7.5 grams per cubic centimeter. The hardness of the powdered metal preform 90 is preferably in a range of from Rockwell B40 to B100, with a preferred hardness of Rockwell B90.

An alternate embodiment of the present retaining apparatus is depicted at 110 in FIG. 9 and includes a formed-in-place retainer 112. Retainer 112 is disposed within a retainer cavity 114 which is cooperatively formed, like in the preceding embodiment, by a socket or counterbore 116 provided in a link 118 and a groove 120 in an end portion 122 of a pin 124. The counterbore 116 has a cylindrical inner surface 126 and an axially outwardly facing surface or bottom wall 128. The groove 120 includes a generally radially disposed, axially inwardly facing surface 130 and a bottom extremity or surface 131.

As shown in the drawing, retainer 112 has been intrusively formed within the cavity 114 and generally conforms to the shape of such cavity, particularly along an interface 132 between the groove 120 and socket 116 and between the outwardly facing surface 128 and the inwardly facing surface 130.

Before being intruded into the groove 120, the retainer 112, as best shown in FIG. 10, starts out as a preform 134 which, in this embodiment, has a generally chevron shaped cross-section having an apex 135 pointing in an axially outward direction from the counterbore 116 in which it is placed. Preform 134 has inner and outer circumferences 136,138, respectively, which are preferably sized to permit free or noninterferring placement of the preform into the counterbore 116 and about the pin end portion 122 prior to forming.

The retainer 112 is forcibly transformed from its preform configuration through engagement by a generally blunt press head 140 having sufficient force to axially flatten the preform 134 and cause its radially outward expansion into tight abutment against the inner surface 126 of the counterbore 116 and cause the inward expansion of the retainer into the groove 120. About 50 tons of force is applied to the retainer 112 to accomplish this transformation. Once intruded into the groove 120, the retainer 112 is in tight abutment against the walls of the groove, particularly against the axially inwardly facing surface 130 thereof.

Another embodiment of the present retaining apparatus is depicted at 210 in FIGS. 11 and 12. As best shown in FIG. 11, a formed-in-place retainer 212 is disposed within a retainer cavity 214 formed by a socket or counterbore 216 in a link 218 and a groove 220 in an end portion 222 of a pin 224. The counterbore 216 includes an inner surface 226 and an outwardly facing surface 228. The groove 220 has an opposing inwardly facing surface 230 which is disposed on the opposite side of an interface 232 between the groove and counterbore from the outwardly facing surface 228.

As best shown in FIG. 12, the retainer 212 preferably starts out as a preform 234 having a flat washer-like configuration with a generally rectangularly shaped cross-section. Like the preceding preform 134, preform 234 is dimensioned so as to be freely positionable within the counterbore 216 prior to its transformation into retainer 212. Preform 234 is preferably impressed by a generally pointed press head 240 with a force of sufficient magnitude to transform the preform 234 into its retainer configuration 212. The axial incusing or penetration of the preform 234 with the press head 240 produces a conically shaped indentation 242 into the retainer 112, as shown in FIG. 11, and causes the radial outward expansion of the retainer into tight abutment with the wall 226 of the counterbore 216 and the radial inward intrusion thereof into the groove 220 where the retainer is in tight abutment against the walls of such groove, particularly, against the axially inwardly facing surface 230 thereof.

INDUSTRIAL APPLICABILITY

To construct an endless track 14, the links 16,16' and 18,18', pins 20 and bushings 22 are assembled in the manner described above. A preform 90 is thereafter placed adjacent the annular opening 85 of the cavity 60. A sufficient force, as by means of a press 97, is then applied to the preform 90 to ram the preform 90 into the cavity 60 resulting in the preform 90 being plastically deformed and intruded into its formed-in-place retainer shape substantially conforming to the shape of the cavity 60. A force in the range of 100,000 to 200,000 pounds (445 to 890 kN) is normally required, with a force of approximately 150,000 pounds (667 kN) being typical. Forces in this range ensures the substantially complete filling of the cavity 60 and the tight wedging of the retainer material against all of the surfaces of the cavity 60. More importantly, the retainer material is tightly compacted between reacting surfaces defined principally by the frustoconical surface 76 of the groove 70 and the second frustoconical surface 86 of the socket 72 which are disposed on opposite sides of the interface 81 between the groove 70 and socket 72 portions of the cavity 60. As a consequence, an axial force F, as shown in FIG. 5, acting on the link outboard end portion 26 is resisted through the shear properties of the formed-in-place retainer 64. Because of its high modulus of elasticity, the retainer 64 is substantially rigid, thus preventing any significant outward axial movement of the outboard end portion 26 on the pin end portion 40. A second preform 90 is similarly pressed into its cavity 62 at the other end of the joint 12.

In an example assembly, an experimental test was run on a laboratory press of a retainer of the above-described configuration made from a ferrous powdered metal material and having a Rockwell B60 hardness. The shear area of about 1.5 square inches (9.68 $CM^2$) along the interface 98 was capable of withstanding a shear force in excess of 50,000 pounds (22,680 Kg) without plastic deformation occurring in the retainer. The powdered metal retainer had a modulus of elasticity of about 19 million psi (131,000 MPa) before deformation, and about 25 million psi (172,000 MPa) after deformation. This increase in modulus of elasticity was in response to the increase in density resulting from the large deformation force applied during intrusion of the preform 90 into the cavity.

It should be noted that by varying the shear area, the shear force carrying capability of the retainer 64 can be varied. Hence, the retainer 64 can be designed in accordance with the actual forces which will be experienced during operation of the various sizes of crawler vehicles. Shear force capability can thereby be maintained at a value greater than the operational forces. As a consequence, an endless track 14 constructed in accordance with the present invention will have joints 12 which have virtually no end play during operation of the crawler-type vehicle.

As noted above, the material of the retainer 64 has a high modulus of elasticity. This produces a force/displacement curve 98, as depicted in FIG. 7, having a steep sloped straight line portion 100 which is in the elastic range of this material and an abrupt curved portion 102 in its plastic range. By providing the retainer 64 with the preferred mechanical properties described above, the elastic limit 104 can be elevated. As a consequence, the retainer 64 is able to withstand a higher force without suffering plastic deformation and with very little deflection. Also, the difference in the force between the elastic limit 104 and the ultimate strength 106 of the material is reduced. It is desirable that the ultimate strength 106 be no more than 25% greater than the elastic limit 104. This is advantageous in that the retainer 64 can be designed to withstand operational forces approaching its elastic limit 104 without too great of an additional force being required to shear the retainer 19 for disassembly purposes. Thus, the force necessary to remove the pin 20 and simultaneously shear the retainer 64 is kept within the capacities of currently employed track presses. This eliminates waste and expenses in acquiring higher capacity track presses.

The retaining apparatus 10 of the present invention enables the track 14 to be disassembled for repair or replacement of worn components, such as the links 16,18 or bushings 22, and then be reassembled. As depicted in FIG. 8, this is accomplished by means of a press 108 which pushes the pin 20 out of the link outboard end portions 26 and 27, while simultaneously shearing the formed-in-place retainers 64 and 66 along their respective interfaces 81. The sheared off portions of the retainers 64 and 66 are thereafter removed from their corresponding grooves 70 and sockets 72. Removal from the grooves 70 is facilitated by the slots 96, shown in FIGS. 2 & 3, which are preferably of a depth so as to extend past the interface 81. As a consequence, the portion of the preform 90 which had been intruded into the groove 70 becomes a plurality of pieces upon being sheared. Ordinarily, these pieces will simply fall out of the groove upon removal of the pin 20 from the joint 12. To rebuild the track 14, the track components are reassembled as they were initially and a new preform 90 is placed adjacent each of the openings 85 of the cavities 60 and 62. A force is applied to each of the preforms 90 to cause their intrusion into their respective cavities 60,62 and deformation into new formed-in-place retainers 64 and 66.

After an extended period of operation of the track 14, a certain amount of end play can develop in the joint 12 due to internal wear between the axially abutting components of the joint 12. If this happens, the retainers 64 and 66 can advantageously be repressed to again eliminate this end play.

Other aspects, objects, and advantages of the present invention will become apparent from a study of the specification, drawings and the following appended claims.

We claim:

1. Apparatus for retaining a track joint, said track joint having a pin and a pair of links, each link having a bore and said pin having first and second end portions each mounted within a respective one of said link bores, comprising:

each of said pin end portions having a groove extending around at least a portion of the circumference of its end portion, each groove having a surface facing in a generally axially inward direction;

each bore of said links having an outwardly opening socket, each socket having a surface facing in a generally axially outward direction, said sockets and respective grooves being in registry with one another and cooperatively defining a respective one of a pair of retainer cavities; and a formed-in-place retainer disposed and formed within and substantially conforming to the shape of each of said retainer cavities, each retainer having a shear strength sufficient to maintain its respective link against outward axial movement on said pin during operation of said track joint.

2. The apparatus of claim 1 wherein each of said retainers is a ferrous material having a modulus of elasticity in the range of 131,000 to 207,000 MPa and a hardness in the range of Rockwell B40 to C35.

3. The apparatus of claim 2 wherein said groove surface is frustoconical and each groove includes a bottom extremity, said frustoconical surface angling outwardly from said bottom extremity towards its respective pin end.

4. The apparatus of claim 3 wherein said socket surface is frustoconical and said links each have an outer side, each of said frustoconical surfaces being disposed in spaced concentric relationship to its respective frustoconical surface of the pin grooves and extending from its respective outer link side.

5. The apparatus of claim 4 wherein said groove frustoconical surface a first selected angle within a range of 20° to 30° said socket frustoconical surface is at a second selected angle within a range of 15° to 25°.

6. The apparatus of claim 4 wherein said link sockets each include a second frustoconical surface extending between said frustoconical surface and the link bore, said second frustoconical surface being at an angle of approximately 45°.

7. The apparatus of claim 2 wherein each of said retainers is initially a preform of a ring-shaped configuration.

8. The apparatus of claim 7 wherein said preform includes a plurality of generally radially oriented slots, said slots extending axially from said one end inwardly a preselected axial distance.

9. The apparatus of claim 8 wherein said preform has a generally rectangular cross-sectional configuration having a beveled face at and a lead-in chamfer about the periphery of one end thereof, said chamfer being disposed at an angle which is substantially equal to the angle of said surface of said sockets.

10. The apparatus of claim 7 wherein said preform has inner and outer circumferences which are sized to permit the free placement of the preform into its socket prior to being formed into said retainer.

11. The apparatus of claim 10 wherein said preform has a generally chevron shaped cross-section having an apex pointing in an axially outward direction from said socket.

12. The apparatus of claim 11 wherein said socket has a cylindrical inner surface and wherein said preform retainer is flattened by an axial press force of sufficient magnitudes to form said retainer by causing the radial outward expansion of said retainer into tight abutment with the inner surface of said socket and causing its radial inward intrusion into said groove of the pin.

13. The apparatus of claim 10 wherein said preform has a flat washer-like configuration with a generally rectangularly shaped cross-section.

14. The apparatus of claim 13 wherein said preform is impressed by a generally pointed press head with a force of sufficient magnitude to transform said preform into said retainer and to cause the radial outward expansion of said retainer into tight abutment with the inner surface of said socket and the radial inward intrusion thereof into said groove of the pin.

15. In a joint of an endless track for a crawler-type vehicle, said joint having a pin and links, said pin having opposite ends and first and second end portions adjacent respective ones of said ends, and said links each having a bore of a size sufficient for receiving a respective one of said first and second pin end portions, the improvement comprising:
each of said first and second pin end portions having a groove, each groove extending around at least a portion of the circumference of its respective pin end portion and spaced a preselected distance from a respective one of said opposite pin ends; and
each of said links having a socket adjacent its bore, each socket being in registry along an interface with a respective one of said pin grooves in the installed position of said links on said pin end portions, respective ones of said sockets and grooves each cooperating to form one of a pair of retainer cavities; and
a metal retainer formed in each of said cavities with a sufficient press force to cause the intrusion of said retainer into and to substantially fill said groove, said retainer extending across said interface and having sufficient shear strength along said interface to maintain its respective link against outward axial movement on the pin during operation of the vehicle.

16. The joint of claim 15 wherein said pin grooves are continuous about their respective pin end portions and each includes a bottom extremity and a groove frustoconical surface, said groove frustoconical surface angling outwardly from said bottom extremity towards its respective pin end.

17. The joint of claim 16 wherein said links each have an outer side and said link sockets are each defined by a first frustoconical surface disposed in a spaced concentric relationship to its respective groove frustoconical surface, said first frustoconical surface extending from its respective outer side and defining an opening to each of said cavities through said outer sides of the links.

18. The joint of claim 17 wherein said groove frustoconical surface is at a first selected angle and said first frustoconical surface of the sockets is at a second selected angle, said second angle being less than said first angle.

19. The joint of claim 18 wherein said first angle is in a range of between 20° to 30° and said second angle is in a range of between 15° to 25°.

20. The joint of claim 19 wherein said link sockets each include a second frustoconical surface extending between said first frustoconical surface and the link bore, said second frustoconical surface being at an angle substantially greater than the angle of said first frustoconical surface.

21. The joint of claim 20 wherein said second frustoconical surface is at an angle of approximately 45°.

22. Apparatus for retaining a joint of an endless track for a crawler-type vehicle, said joint including a pair of inboard end link portions, a hollow bushing, a pin and a pair of outboard end link portions, said pin having a mid portion, opposite ends and first and second end portions adjacent said opposite ends, said mid portion being of a size sufficient to be pivotally received within said hollow bushing, and said outboard end link portions being adapted to abut the opposite sides of said inboard end link portions and each having an outer side and a bore of a size sufficient to fixedly receive a respective one of said first and second pin end portions, said apparatus comprising:
each of said first and second pin end portions having a groove, each groove having a surface facing generally axially inward and each groove extending around at least a portion of the circumference of its respective pin end portion at a location spaced a preselected distance from its respective pin end;
each of said link outboard end portions having a socket adjacent its respective pin bore, each of said sockets having a surface facing generally axially outward and each socket being in registry along an interface with a respective one of said pin grooves in the installed position of the link end portions on said pin end portions, said respective sockets and grooves each defining a retainer cavity opening on the outer side of its respective link outboard end portion; and
a pair of metal formed-in-place retainers each positioned in and filling a respective cavity between said groove surface and said socket surface and each retainer having a sufficient shear strength along said socket-groove interface to maintain its respective link end portion in abutting relationship against its respective link inboard end portion during operation of said endless track.

23. The apparatus of claim 22 wherein each of said retainers is a ferrous material.

24. The apparatus of claim 23 wherein said ferrous material has a modulus of elasticity in the range of 131,000 to 207,000 MPa.

25. The apparatus of claim 24 wherein said retainers are wrought steel having a hardness in the range of Rockwell B60 to C35.

26. The apparatus of claim 24 wherein said retainers have a hardness of approximately Rockwell B90.

27. The apparatus of claim 24 wherein each of said retainers is initially a preform of a ring-shaped configuration and having a generally rectangular cross-sectional configuration.

28. The apparatus of claim 27 wherein said preform has a lead-in chamfer about the periphery of one end thereof, said chamfer having an angle which is substantially equal to the angle of said first frustoconical surface of said sockets.

29. The apparatus of claim 28 wherein said one end of said preform also includes a beveled face.

30. The apparatus of claim 29 wherein said preform includes a plurality of generally radially oriented slots, said slots extending axially from said one end inwardly a preselected axial distance.

31. The apparatus of claim 27 wherein said preform is a powdered metal having an initial minimum density of 6.8 grams per cubic centimeter.

32. The apparatus of claim 31 wherein said powdered metal has a minimum density of 7.5 grams per cubic centimeter after intrusion into said cavities.

33. The apparatus of claim 32 wherein said preform has a hardness in the range of Rockwell B40 to B100.

34. The apparatus of claim 33 wherein said preform has a hardness of approximately Rockwell B90.

35. The apparatus of claim 22 wherein said groove surface is frustoconical, said pin grooves are continuous about their respective pin end portions and each groove includes a bottom extremity, said frustoconical surface angling outwardly from said bottom extremity towards its respective pin end.

36. The apparatus of claim 35 wherein said surface of each of said sockets is frustoconical, each of said frustoconical surfaces being disposed in spaced concentric relationship to its respective frustoconical surface of the pin grooves extending from its respective outer link side.

37. The apparatus of claim 36 wherein said groove frustoconical surface is at a first selected angle and said first socket frustoconical surface is at a second selected angle, said second angle being less than said first angle.

38. The apparatus of claim 37 wherein said first angle is within of 20° to 30° and said second angle is in a range of 15° to 25°.

39. The apparatus of claim 36 wherein said link sockets each include a second frustoconical surface extending between said first frustoconical surface and the link bore, said second frustoconical surface being at an angle substantially greater than the angle of said first frustoconical surface.

40. The apparatus of claim 39 wherein said second frustoconical surface is at an angle of approximately 45°.

* * * * *